US012678987B2

(12) United States Patent
Kurino

(10) Patent No.: US 12,678,987 B2
(45) Date of Patent: Jul. 14, 2026

(54) OPTICAL FIBER CUTTING DEVICE

(71) Applicant: SUMITOMO ELECTRIC OPTIFRONTIER CO., LTD., Kanagawa (JP)

(72) Inventor: Shinsuke Kurino, Kanagawa (JP)

(73) Assignee: Sumitomo Electric Optifrontier Co., Ltd., Kanagawa (JP)

( * ) Notice: Subject to any disclaimer, the term of this patent is extended or adjusted under 35 U.S.C. 154(b) by 302 days.

(21) Appl. No.: 18/555,945

(22) PCT Filed: Mar. 31, 2022

(86) PCT No.: PCT/JP2022/016684
§ 371 (c)(1),
(2) Date: Oct. 18, 2023

(87) PCT Pub. No.: WO2022/224801
PCT Pub. Date: Oct. 27, 2022

(65) Prior Publication Data
US 2024/0208097 A1 Jun. 27, 2024

(30) Foreign Application Priority Data
Apr. 19, 2021 (JP) ................................. 2021-070298

(51) Int. Cl.
B26D 1/143 (2006.01)
B26D 3/16 (2006.01)
(Continued)

(52) U.S. Cl.
CPC ............... B26D 1/143 (2013.01); B26D 3/16 (2013.01); B26F 3/00 (2013.01); B26F 3/002 (2013.01); G02B 6/25 (2013.01)

(58) Field of Classification Search
CPC ... B26D 1/143; B26D 3/16; B26F 3/00; B26F 3/002; G02B 6/25
See application file for complete search history.

(56) References Cited

U.S. PATENT DOCUMENTS 7,070,078 B2 * 7/2006 Song ........................ B26D 1/18
385/136
8,092,100 B2 * 1/2012 Song ...................... G02B 6/245
385/99
(Continued)

FOREIGN PATENT DOCUMENTS

| CN | 102998744 A | 3/2013 |
| CN | 203204192 U | 9/2013 |

(Continued)

*Primary Examiner* — Ryan A Lepisto
(74) *Attorney, Agent, or Firm* — McDonald Hopkins LLC

(57) ABSTRACT

There is provided an optical fiber cutting device that cuts an optical fiber, the device including: a main body; a lid body; a first connecting portion that rotatably connects the lid body to the main body; a moving portion including a blade portion for scratching the optical fiber and attached to the main body to be movable between a first position and a second position; and a second connecting portion that connects the lid body and the moving portion, in which the blade portion is configured to scratch the optical fiber while the moving portion moves from the first position to the second position, and as the lid body rotates in a direction away from the main body, the moving portion moves from the second position to the first position via the second connecting portion.

4 Claims, 10 Drawing Sheets

(51) Int. Cl.
    *B26F 3/00*       (2006.01)
    *G02B 6/25*      (2006.01)

(56) References Cited

U.S. PATENT DOCUMENTS

| | | | |
|---|---|---|---|
| 9,016,535 B2 * | 4/2015 | Hasegawa | G02B 6/25 |
| | | | 225/96 |
| 9,395,492 B2 * | 7/2016 | Hasegawa | B26D 3/08 |
| 9,435,954 B2 * | 9/2016 | Zhao | B26D 7/02 |
| 10,538,454 B2 * | 1/2020 | Kawanishi | C03B 37/16 |
| 2010/0163593 A1 * | 7/2010 | Song | G02B 6/25 |
| | | | 225/96 |
| 2014/0069979 A1 | 3/2014 | Kruzel | |
| 2015/0128779 A1 | 5/2015 | Zhao | |
| 2018/0334406 A1 | 11/2018 | Kawanishi et al. | |
| 2022/0043213 A1 | 2/2022 | Kurino | |

FOREIGN PATENT DOCUMENTS

| | | |
|---|---|---|
| CN | 204065455 U | 12/2014 |
| CN | 207882487 U | 9/2018 |
| JP | H11-101924 A | 4/1999 |
| JP | 2000-241652 A | 9/2000 |
| JP | 2018-146802 A | 9/2018 |
| WO | 2020-066407 A1 | 4/2020 |

\* cited by examiner

OPTICAL FIBER CUTTING DEVICE

CROSS-REFERENCE TO RELATED APPLICATIONS

The present application claims priority from Japanese Patent Application No. 2021-070298 filed on Apr. 19, 2021, the entire contents of which are hereby incorporated by reference.

TECHNICAL FIELD

The present disclosure relates to an optical fiber cutting device.

BACKGROUND ART

As an optical fiber cutting device, WO2020/66407A discloses an apparatus that positions an optical fiber, moves a blade portion to damage the optical fiber, and presses the damaged part to cut the optical fiber.

SUMMARY OF INVENTION

According to an aspect of the present disclosure, there is provided an optical fiber cutting device that cuts an optical fiber, the device including:

a main body;

a lid body;

a first connecting portion that rotatably connects the lid body to the main body;

a moving portion including a blade portion for scratching the optical fiber and attached to the main body to be movable between a first position and a second position; and a second connecting portion that connects the lid body and the moving portion, in which the blade portion is configured to scratch the optical fiber while the moving portion moves from the first position to the second position, and as the lid body rotates in a direction away from the main body, the moving portion moves from the second position to the first position via the second connecting portion.

DESCRIPTION OF EMBODIMENTS

Technical Problem

Figure 1:
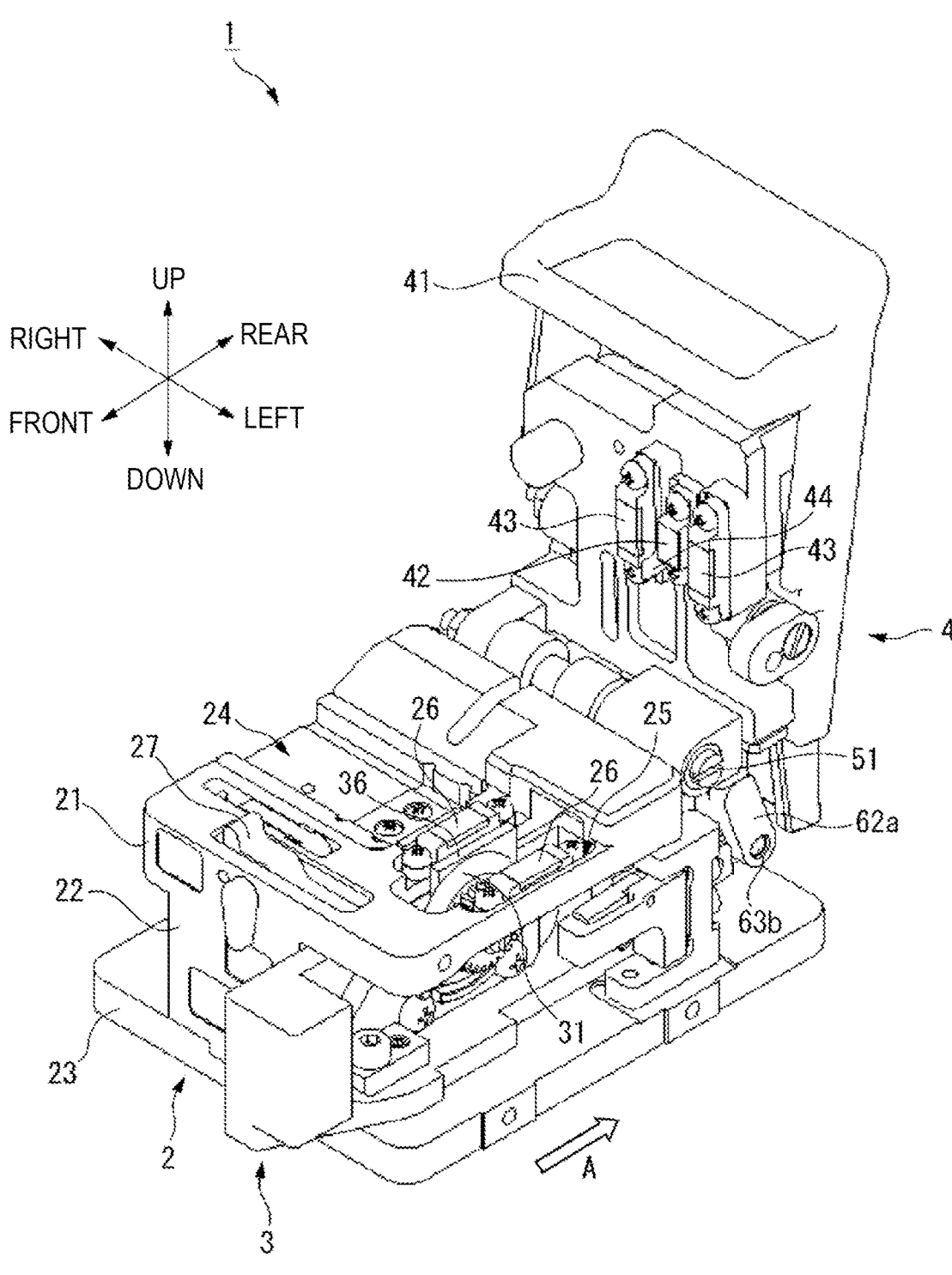
FIG. 1 is a perspective view showing a state where a lid body of an optical fiber cutting device according to an embodiment of the present disclosure is opened.

In the optical fiber cutting device of the related art, the movement of the blade portion during cutting and the movement of the blade portion to the initial position after cutting require a predetermined operation by the user, and there is room for improvement in workability.

An object of the present disclosure is to provide an optical fiber cutting device with high workability.

Solution to Problem (1) According to an aspect of the present disclosure, there is provided an optical fiber cutting device that cuts an optical fiber, the device including:

a main body;

a lid body;

a first connecting portion that rotatably connects the lid body to the main body;

a moving portion including a blade portion for scratching the optical fiber and attached to the main body to be movable between a first position and a second position; and a second connecting portion that connects the lid body and the moving portion, in which the blade portion is configured to scratch the optical fiber while the moving portion moves from the first position to the second position, and as the lid body rotates in a direction away from the main body, the moving portion moves from the second position to the first position via the second connecting portion.

With such configuration, it is possible to provide an optical fiber cutting device with high workability.

Specifically, by opening the lid body after cutting the optical fiber, the moving object automatically returns to the first position, and thus the user does not need to return the moving object to the first position. As a result, workability can be improved.

(2) In the optical fiber cutting device according to the above (1), preferably, the second connecting portion is a link mechanism including two or more link arms.

With such configuration, it is possible to move the moving object from the second position to the first position with a simple structure. As a result, the manufacturing of the optical fiber cutting device can be facilitated and the cost can be reduced.

(3) In the optical fiber cutting device according to the above (1) or (2), preferably, the first connecting portion includes a first spring that biases the lid body to rotate in a direction away from the main body.

With such configuration, when the user releases the lid body, the lid body automatically rotates in the direction away from the main body. That is, not only the user does not need to return the moving object to the first position, but also does not need to open the lid body after cutting the optical fiber. As a result, workability can be further improved.

(4) In the optical fiber cutting device according to any one of the above (1) to (3), preferably, the device further includes:

a second spring biasing the moving portion to move from the first position to the second position; and a lock mechanism that locks the second spring in a compressed state, in which the lid body includes a releasing portion that acts on the lock mechanism to release the lock when the lid body is closed, and when the moving portion moves from the second position to the first position via the second connecting portion, the moving portion compresses the second spring, and the lock mechanism locks the second spring in a compressed state.

With such configuration, when the user closes the lid body, the moving portion automatically moves from the first position to the second position. That is, not only the user does not need to return the moving object to the first position, but also does not need to move the moving portion from the first position to the second position after closing the lid body. As a result, workability can be further improved. When the configuration of (4) is adopted in the optical fiber cutting device described in (3), the three operations that have been required in the related art become unnecessary, and it is possible to further improve workability.

(5) In the optical fiber cutting device according to the above (4), preferably, the lock mechanism has a seesaw structure, the moving portion includes an engagement groove that engages with a projection provided at a first end portion of the seesaw structure, the second spring is locked in a compressed state by engaging the projection with the engagement groove when the moving portion is in the first position, and when the lid body is closed, the projection and the engagement groove are disengaged by pushing a second end portion on a side opposite to a first end portion of the seesaw structure with the releasing portion.

With such configuration, it is possible to lock the second spring in a compressed state with a simple structure. As a result, the manufacturing of the optical fiber cutting device can be facilitated and the cost can be reduced.

Advantageous Effects of Invention

According to the configuration disclosed above, it is possible to provide an optical fiber cutting device with high workability.

DESCRIPTION OF EMBODIMENTS

Hereinafter, examples of embodiments according to the present disclosure will be described with reference to the drawings. In the following description, the same or corresponding elements will be given the same reference numerals even in different drawings, and overlapping descriptions will be omitted as appropriate. In each drawing used for the following description, the scale is appropriately changed such that each member has a recognizable size.

Figure 2:
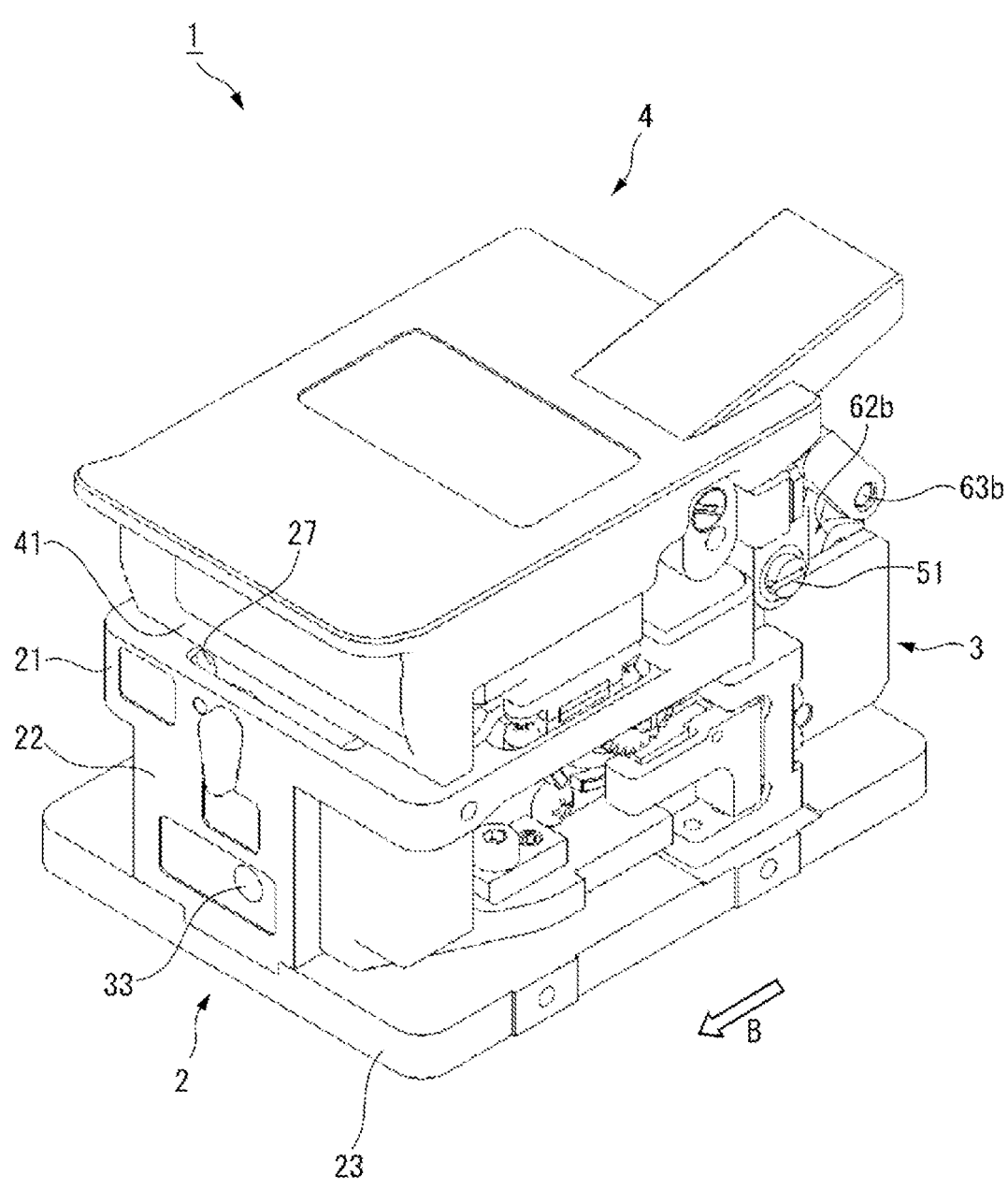
FIG. 2 is a perspective view showing a state after the optical fiber is cut by closing the lid body of the optical fiber cutting device shown in FIG. 1.

First, the configuration of the optical fiber cutting device according to the present embodiment will be described with reference to FIGS. 1 and 2. FIG. 1 is a perspective view showing a state where a lid body 4 of an optical fiber cutting device 1 according to the present embodiment is opened. FIG. 2 is a perspective view showing a state after the optical fiber is cut by closing the lid body 4 of the optical fiber cutting device 1 shown in FIG. 1.

In the specification, "front", "rear", "left", "right", "up", and "down" are based on the directions shown in FIG. 1. A "front-rear direction" is a direction that includes the "forward" direction and the "rearward" direction. The "front-rear direction" can also be referred to as the direction in which a moving portion 3 moves. An "up-down direction" is a direction that includes an "upward" direction and a "downward" direction. The "upward" direction is the direction in which a top plate portion 21 of a main body 2 is positioned, and the "downward" direction can also be referred to as the direction in which a bottom plate portion 23 of the main body 2 is positioned. A "left-right direction" is a direction that includes a "leftward" direction and a "rightward" direction. The "left-right direction" can also be referred to as a direction orthogonal to the front-rear direction and the up-down direction. The directions are for convenience of explanation and do not limit the present disclosure.

As shown in FIGS. 1 and 2, the optical fiber cutting device 1 is a device that cuts an optical fiber (not shown). The optical fiber cutting device 1 includes the main body 2, the moving portion 3, the lid body 4, and a spindle (first connecting portion) 51.

The main body 2 includes the top plate portion 21, the bottom plate portion 23 disposed below the top plate portion 21, and an intermediate portion 22 connecting the top plate portion 21 and the bottom plate portion 23. The main body 2 is formed with the top plate portion 21, the intermediate portion 22, and the bottom plate portion 23 to have a substantially I-shaped cross section. The main body 2 is made of metal, resin, or the like, for example.

The top plate portion 21 includes a positioning portion 24, an exposure hole 25, a pair of lower clamp portions 26, and a lock mechanism 27. The positioning portion 24 is provided on the upper surface of the top plate portion 21. The positioning portion 24 positions the optical fiber to be cut. The optical fiber is fixed by, for example, an optical fiber holder (not shown) and is cut while the optical fiber holder is positioned by the positioning portion 24. The exposure hole 25 is provided near the positioning portion 24 to extend in a direction orthogonal to the axial direction of the optical fiber positioned by the positioning portion 24. The pair of lower clamp portions 26 are fixed to sandwich the exposure hole 25. The lock mechanism 27 locks a second spring 32 (refer to FIG. 4), which will be described later, in a compressed state. The action of the lock mechanism 27 will be detailed in the following paragraphs.

The intermediate portion 22 includes a guide portion (not shown) provided to extend along the moving direction of the moving portion 3 (for example, the front-rear direction). The guide portion is, for example, a groove having a substantially U-shaped cross section and guides the movement of the moving portion 3. The intermediate portion 22 also includes the second spring 32 and a shaft member 33 extending in the front-rear direction inside the intermediate portion 22. The members will be described in detail in the following paragraphs.

Between the top plate portion 21 and the bottom plate portion 23, the moving portion 3 is attached to the main body 2 to be movable between a first position (the position shown in FIG. 1) and a second position (the position shown in FIG. 2). For example, when the lid body 4 is closed in the state shown in FIG. 1, the moving portion 3 automatically moves in the direction indicated by an arrow A. When the lid body 4 is opened in the state shown in FIG. 2, the moving portion 3 automatically moves in the direction indicated by an arrow B. A configuration for automatically moving the moving portion 3 will be described in detail in the following paragraphs.

The moving portion 3 may be configured to move linearly between the first position and the second position, or may be configured to move on a track including curved lines, or both of the movements may be possible. When both of the above movements are possible, for example, the movement mode of the moving portion 3 is configured to be selectable during use.

A guide block (not shown) including, for example, a ball slide (not shown) is provided on the side surface of the moving portion 3 on the intermediate portion 22 side. The guide block is slidably supported by the guide portion of the intermediate portion 22 via the ball slide, allowing the moving portion 3 to move in the front-rear direction. In the present embodiment, the moving portion 3 is configured to be movable only rearward from the first position and movable only forward from the second position.

The moving portion 3 includes a blade portion 31 and a projection portion 36. The blade portion 31 is disposed to move along with the movement of the moving portion 3 and to scratch the optical fiber while the moving portion 3 moves from the first position to the second position. Although the shape of the blade portion 31 is not particularly limited, the blade portion is a round blade in the present embodiment. The blade portion 31 may be configured to move linearly along the movement of the moving portion 3, or may be configured to move along a track that draws a gentle arc when viewed from the side surface, or both of the movements may be possible.

The projection portion 36 pushes an engaging piece 44 of the lid body 4 while moving the moving portion 3 from the first position to the second position when the lid body 4 is closed. The engaging piece 44 is, for example, a projection formed of a flexible member, and is elastically deformable. While the engaging piece 44 is pushed in, a breaking member 42 is held against biasing force of a spring (not shown). When the moving portion 3 moves further and reaches the second position, the projection portion 36 passes through the engaging piece 44, and the breaking member 42 stops resisting the biasing force of the spring. The breaking member 42 descends due to the biasing force and hits the glass fiber part of the optical fiber. The optical fiber is cut starting from the scratch attached to the glass fiber part by the blade portion 31 while the moving portion 3 is moving from the first position to the second position.

The lid body 4 is connected to the main body 2 via the spindle (first connecting portion) 51 to be freely openable and closable. In other words, the spindle 51 rotatably connects the lid body 4 to the main body 2. The lid body 4 includes a releasing portion 41, the breaking member 42, a pair of upper clamp portions 43 and the engaging piece 44. The releasing portion 41 acts on the lock mechanism 27 to release the lock when the lid body 4 is closed. The breaking member 42 is provided between the pair of upper clamp portions 43. The breaking member 42 presses the glass fiber part of the optical fiber that is scratched by the blade portion 31 to extend the scratch and break and cut the glass fiber part. The pair of upper clamp portions 43 are arranged to face the pair of lower clamp portions 26, respectively. When the lid body 4 is closed, the glass fiber part of the optical fiber to be cut is clamped and fixed between the upper clamp portion 43 and the lower clamp portion 26. The engaging pieces 44 are as already described.

Next, a method of using the optical fiber cutting device 1 will be described with reference to FIGS. 3A to 7. FIGS. 3A to 3D are side views showing the method of using the optical fiber cutting device 1. FIG. 4 is a partial cross-sectional view of the optical fiber cutting device 1 in the state of FIG. 3A.

Figure 3A:
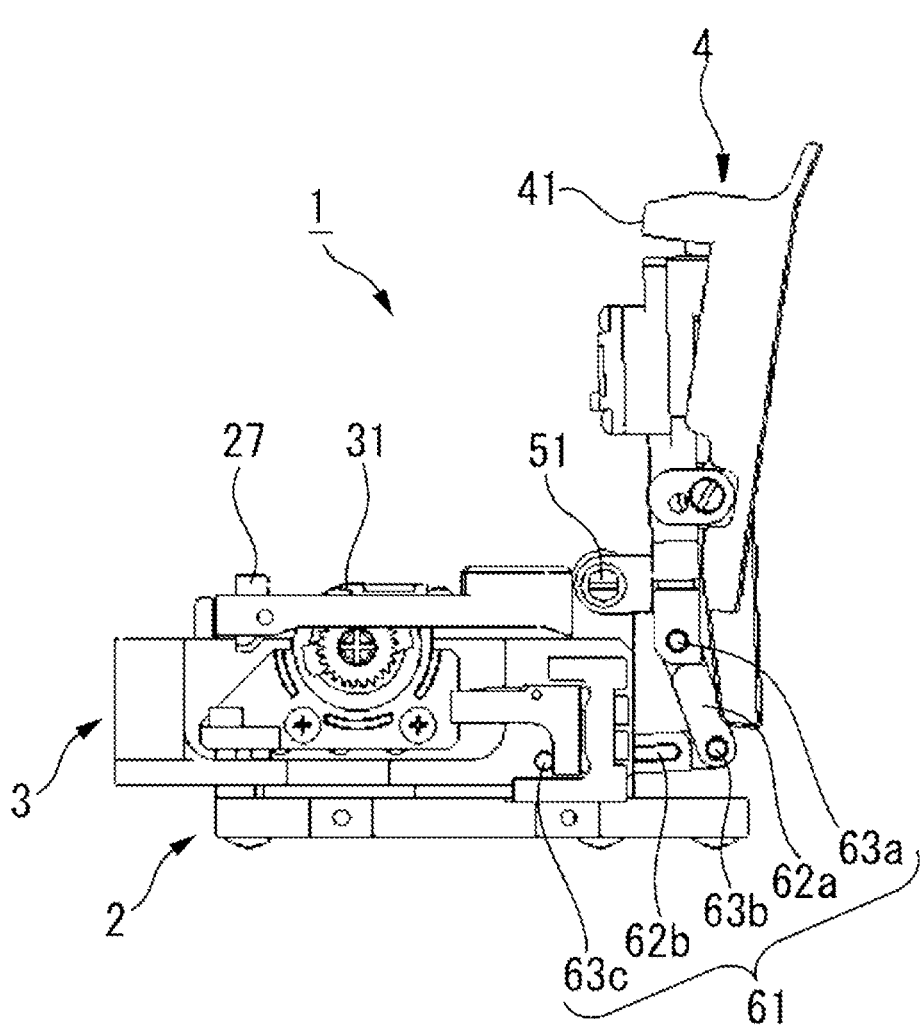
FIG. 3A is a side view showing a method of using the optical fiber cutting device shown in FIG. 1.
Figure 3B:
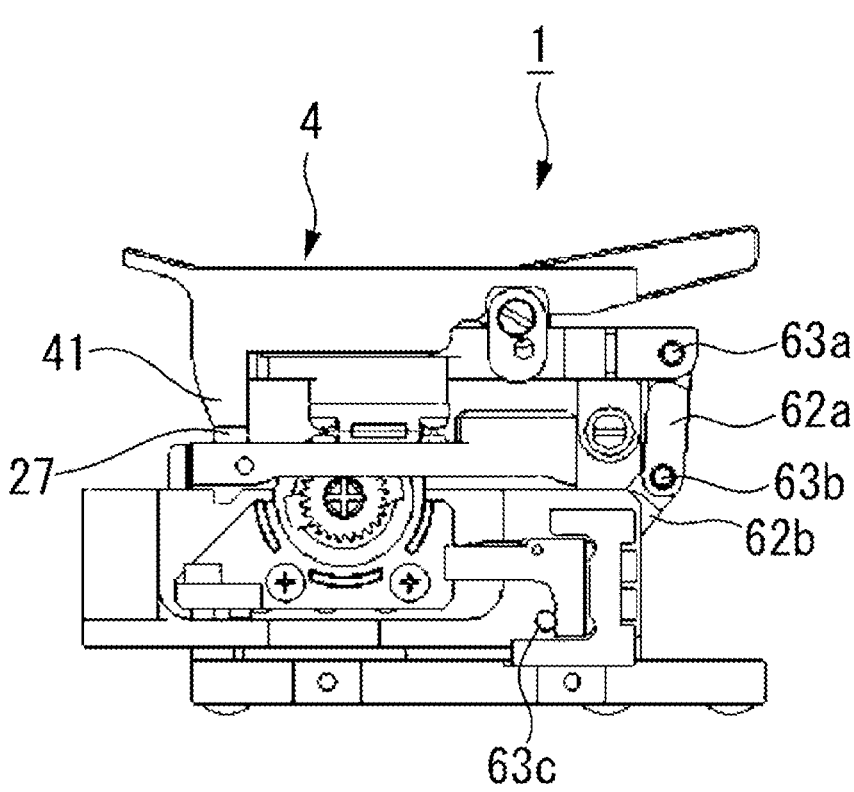
FIG. 3B is a side view showing the method of using the optical fiber cutting device shown in FIG. 1.
Figure 3C:
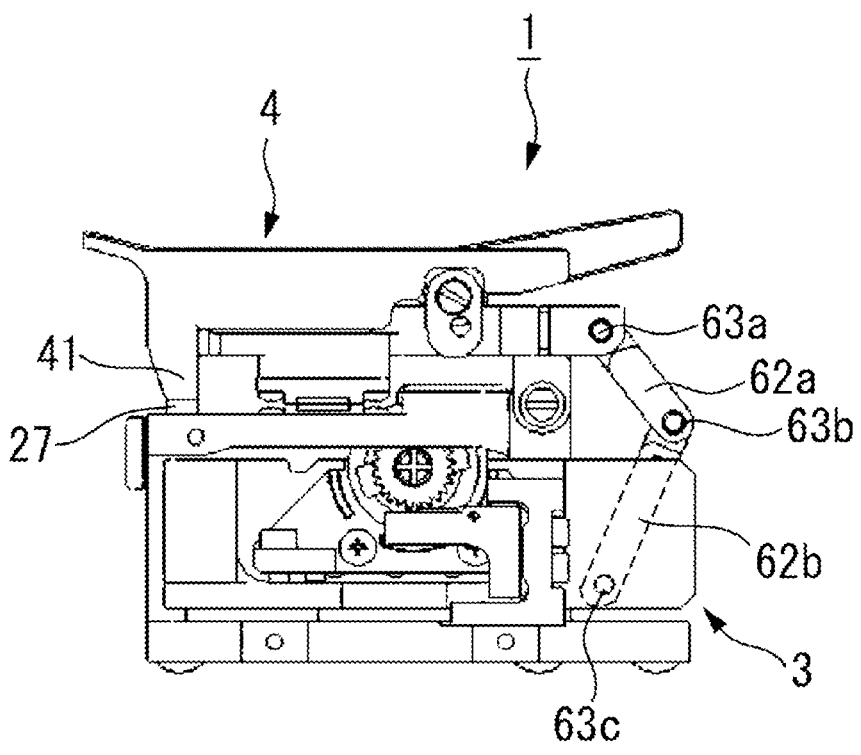
FIG. 3C is a side view showing the method of using the optical fiber cutting device shown in FIG. 1.
Figure 4:
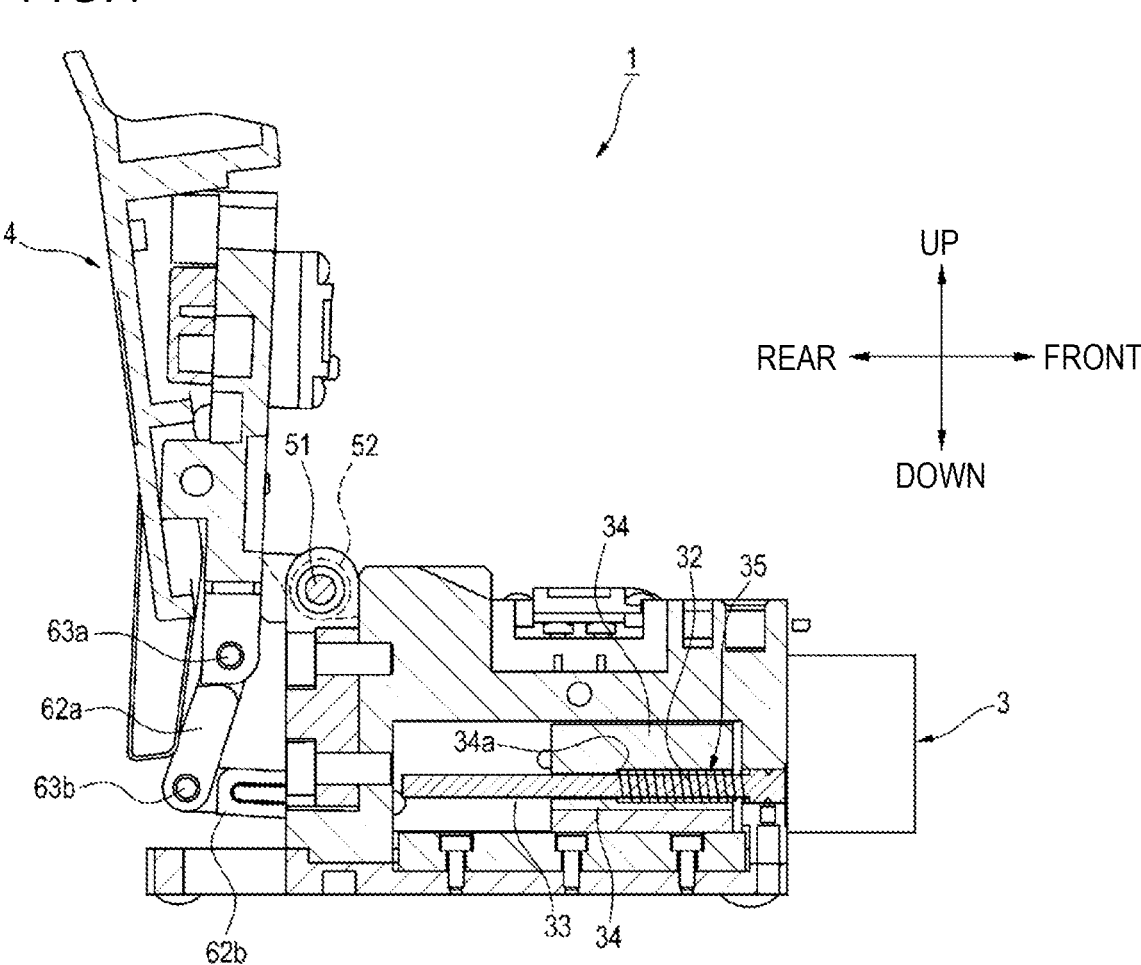
FIG. 4 is a partial cross-sectional view of the optical fiber cutting device in the state of FIG. 3A.
Figure 5:
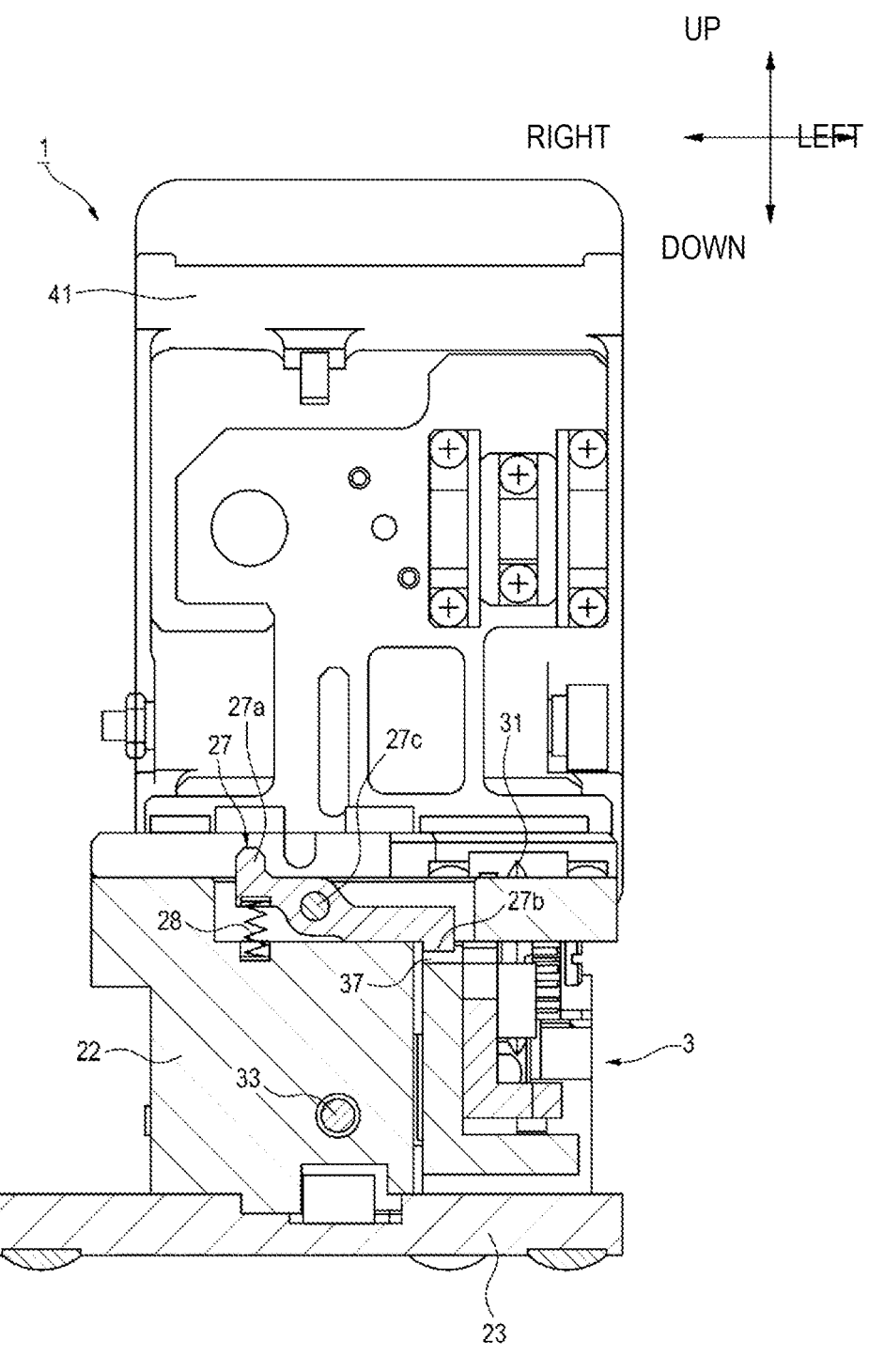
FIG. 5 is a partial cross-sectional view of the optical fiber cutting device in the state of FIG. 3A viewed from a direction different from that of FIG. 4.
Figure 6:
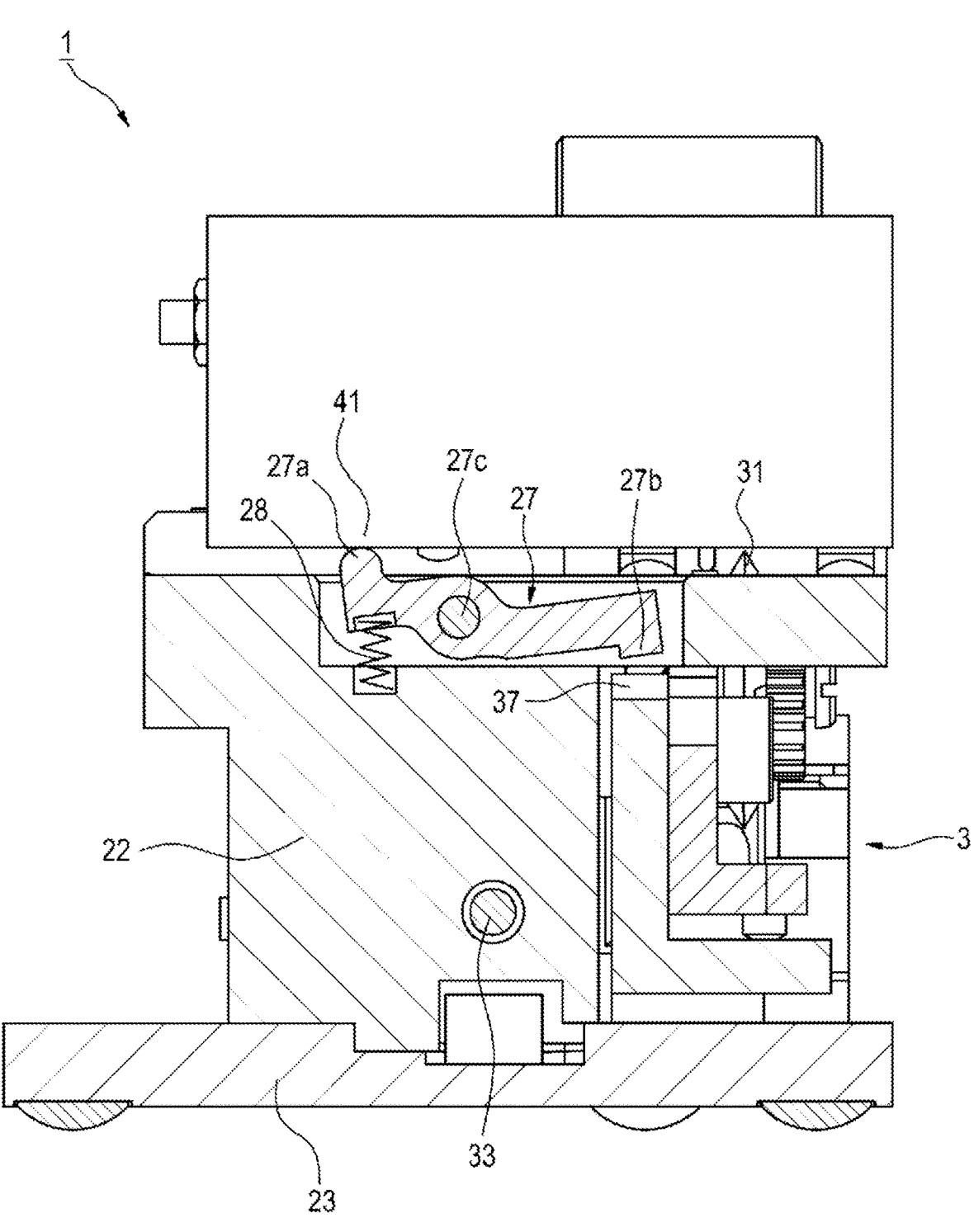
FIG. 6 is a partial cross-sectional view of the optical fiber cutting device in the state of FIG. 3B.
Figure 7:
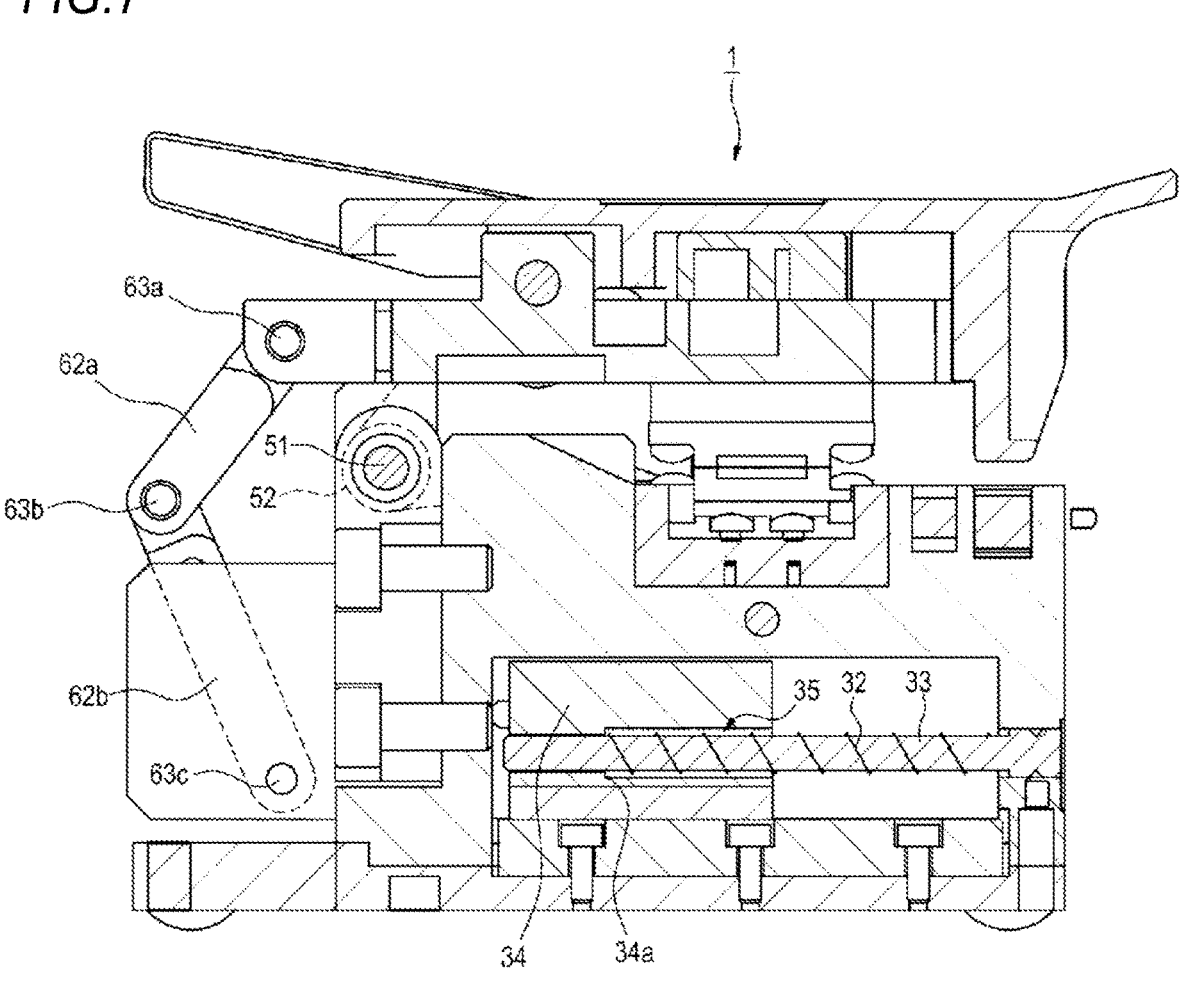
FIG. 7 is a partial cross-sectional view of the optical fiber cutting device in the state of FIG. 3C.

FIG. 5 is a partial cross-sectional view of the optical fiber cutting device in the state of FIG. 3A viewed from a direction different from that of FIG. 4. FIG. 6 is a partial cross-sectional view of the optical fiber cutting device 1 in the state of FIG. 3B. FIG. 7 is a partial cross-sectional view of the optical fiber cutting device in the state of FIG. 3C. The hatched cross sections in FIGS. 4 and 7 are cross sections obtained by cutting the optical fiber cutting device 1 on a plane passing through the shaft member 33 and including the up-down direction and the front-rear direction. The hatched cross sections in FIGS. 5 and 6 are cross sections obtained by cutting the optical fiber cutting device 1 on a plane passing through the lock mechanism 27 and including the up-down direction and the left-right direction.

FIG. 3A shows a state where the lid body 4 is opened and the moving portion 3 is at the first position. Here, the user positions the optical fiber to be cut. As shown in FIG. 3A, in the optical fiber cutting device 1, the moving portion 3 and the lid body 4 are connected by a link mechanism (second connecting portion) 61. The link mechanism 61 includes link arms 62a and 62b and joints 63a to 63c. The joint 63a rotatably connects the link arm 62a to the lid body 4. The joint 63b rotatably connects the link arms 62a and 62b to each other. The joint 63c rotatably connects the link arm 62b to the moving portion 3. Although not shown, the joints 63a to 63c may include stoppers that prevent the link arms 62a and 62b from rotating beyond a predetermined rotation range.

FIG. 4 shows the state of the second spring 32 when the optical fiber cutting device 1 is in the state of FIG. 3A. The second spring 32 is, for example, a compression coil spring. The second spring 32 is supported by the shaft member 33 that is a guide rod.

The protrusion portion 34 is a part of the moving portion 3 and is a member provided to protrude to the right of the moving portion 3. The protrusion portion 34 includes a through-hole 35 passing through the protrusion portion 34 in the front-rear direction. The shaft member 33 supporting the second spring 32 is inserted through the through-hole 35. The protrusion portion 34 also includes a contact wall 34a that comes into contact with the second spring 32 inside the through-hole 35. In the example of FIG. 4, the second spring 32 is being compressed by forward force applied by the contact wall 34a.

Here, FIG. 5 shows the lock mechanism 27 that locks the second spring 32 in a compressed state. The lock mechanism 27 has a seesaw structure rotatably supported by a seesaw shaft 27c. A projection 27b that engages with the engagement groove 37 provided in the moving portion 3 is provided at the left end portion of the lock mechanism 27. While the projection 27b is engaged with the engagement groove 37, the rearward movement of the moving portion 3 is restricted. That is, since the protrusion portion 34 also cannot move rearward, the second spring 32 is locked in a compressed state.

Return to the description of FIGS. 3A to 3D. FIG. 3B shows a state where the lid body 4 is closed from the state in FIG. 3A, and the moving portion 3 is in the first position. Here, the glass fiber part of the optical fiber is clamped and fixed between the upper clamp portion 43 and the lower clamp portion 26. FIG. 3C shows a state where the moving portion 3 is moved to the second position from the state in FIG. 3B. While the moving portion 3 is moving from the first position to the second position, the glass fiber part of the optical fiber is scratched by the blade portion 31 and pressed by the breaking member 42, and accordingly, the scratch extends and the optical fiber is cut. In FIGS. 3B and 3C, the user of the optical fiber cutting device 1 is applying force to the lid body 4 to close the lid body 4.

FIG. 6 shows how the lock mechanism 27 is unlocked when the optical fiber cutting device 1 is in the state of FIG. 3B. As shown in FIG. 6, when the lid body 4 is closed, a right end portion 27a of the lock mechanism 27 is pushed downward by the releasing portion 41 of the lid body 4, and the lock mechanism 27 rotates counterclockwise around the seesaw shaft 27c. The projection 27b is also lifted upward by rotating counterclockwise around the seesaw shaft 27c, and the projection 27b and the engagement groove 37 are disengaged. As such, a mechanism in which the seesaw shaft 27c (rotating shaft) serving as a fulcrum at an intermediate portion between the projection 27b provided at the left end portion (first end portion) of the lock mechanism 27 and the right end portion 27a (second end portion) opposite to the left end portion, is provided, and the projection 27b at the left end portion and the right end portion 27a of the lock mechanism 27 rotate in the same rotation direction around the seesaw shaft 27c (rotating shaft), is referred to as a seesaw structure.

When the projection 27b is disengaged from the engagement groove 37, the restriction on the rearward movement of the protrusion portion 34 is also lifted. That is, the compressed state of the second spring 32 is unlocked, and the second spring 32 attempts to restore the original state thereof. Here, the contact wall 34a of the protrusion portion 34 is biased rearward by restoring force of the second spring 32. That is, the moving portion 3 is biased by the second spring 32 to move from the first position to the second position, and the state shown in FIG. 3B changes to the state shown in FIG. 3C.

FIG. 7 shows the state of the second spring 32 when the optical fiber cutting device 1 is in the state of FIG. 3C. The second spring 32 is in a more expanded state than the compressed state shown in FIG. 5 due to the unlocking as described above.

Figure 3D:
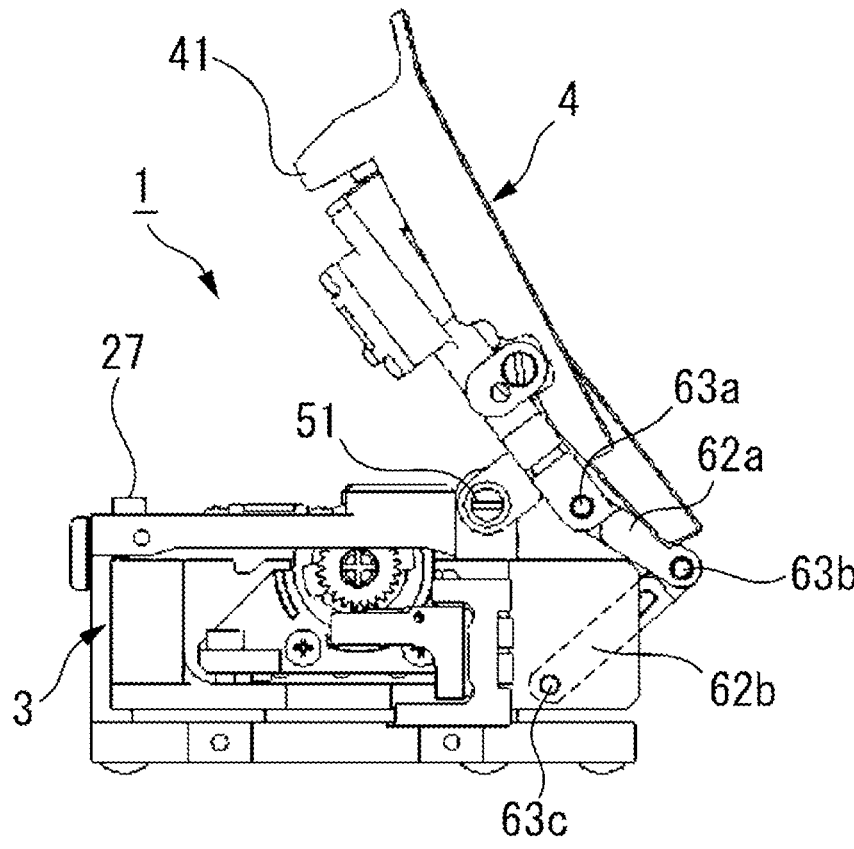
FIG. 3D is a side view showing the method of using the optical fiber cutting device shown in FIG. 1.

Return to the description of FIGS. 3A to 3D. FIG. 3D shows the state after FIG. 3C and the state after the user of the optical fiber cutting device 1 releases the lid body 4. The spindle 51 includes a first spring 52 (refer to FIGS. 4 and 7) that biases the lid body 4 to rotate in the direction away from the main body 2. The first spring 52 is, for example, a torsion coil spring. When the user releases the lid body 4, the biasing force of the first spring 52 automatically rotates the lid body 4 in the direction away from the main body 2. To improve convenience in carrying, a second lock mechanism may be provided that can fix the lid body 4 in a closed state. A known structure of the related art can be adopted as the structure of the second lock mechanism.

When the lid body 4 rotates in the direction away from the main body 2, the action of the link mechanism 61 moves the moving portion 3 from the second position to the first position. Specifically, the rotating motion of the lid body 4 is converted by the link arms 62a and 62b into force for moving the moving portion 3 rearward, and the moving portion 3 is moved rearward. The second spring 32 is compressed again by moving the moving portion 3 rearward.

When the lid body 4 rotates in the direction away from the main body 2, the releasing portion 41 is separated from the lock mechanism 27. The restoring force of a third spring 28 provided below the right end portion 27a of the lock mechanism 27 lifts the right end portion 27a upward, causing the lock mechanism 27 to rotate clockwise around the seesaw shaft 27c. That is, the projection 27b moves downward. At the timing when the moving portion 3 returns to the first position by the link mechanism 61, the projection 27b and the engagement groove 37 are engaged again. As a result, the second spring 32 will be locked in a compressed state again.

While the invention has been described in detail above with reference to specific embodiments, it will be apparent to those skilled in the art that various changes or modifications can be made without departing from the spirit and scope of the present invention. The number, positions, shapes, and the like of the constituent members described above are not limited to those in the above embodiment, and can be changed to suitable numbers, positions, shapes, and the like in carrying out the present invention.

For example, although the link mechanism 61 is provided in the above-described embodiment, when the lid body 4 rotates in the direction away from the main body 2, the moving portion 3 can be moved from the second position to the first position, and accordingly, other configurations may be adopted as long as the configurations are possible. For example, instead of the link mechanism 61, a cam mechanism, a crank mechanism, or the like may be employed.

What is claimed is:

1. An optical fiber cutting device that cuts an optical fiber, the device comprising:

a main body;

a lid body;

a first connecting portion that rotatably connects the lid body to the main body;

a moving portion including a blade portion for scratching the optical fiber and attached to the main body to be movable between a first position and a second position; and a second connecting portion including two link arms that rotatably connect the lid body and the moving portion, wherein the blade portion is configured to scratch the optical fiber while the moving portion moves from the first position to the second position, and as the lid body rotates in a direction away from the main body, the moving portion moves from the second position to the first position via the second connecting portion.

2. The optical fiber cutting device according to claim 1, wherein the first connecting portion includes a first spring that biases the lid body to rotate in a direction away from the main body.

3. An optical fiber cutting device that cuts an optical fiber, the device comprising:

a main body;

a lid body;

a first connecting portion that rotatably connects the lid body to the main body;

a moving portion including a blade portion for scratching the optical fiber and attached to the main body to be movable between a first position and a second position;

a second connecting portion that connects the lid body and the moving portion;

a second spring biasing the moving portion to move from the first position to the second position; and a lock mechanism that locks the second spring in a compressed state, wherein the blade portion is configured to scratch the optical fiber while the moving portion moves from the first position to the second position, as the lid body rotates in a direction away from the main body, the moving portion moves from the second position to the first position via the second connecting portion, wherein the lid body includes a releasing portion that acts on the lock mechanism to release the lock when the lid body is closed, and when the moving portion moves from the second position to the first position via the second connecting portion, the moving portion compresses the second spring, and the lock mechanism locks the second spring in a compressed state.

4. The optical fiber cutting device according to claim 3, wherein the lock mechanism has a seesaw structure, the moving portion includes an engagement groove that engages with a projection provided at a first end portion of the seesaw structure, the second spring is locked in a compressed state by engaging the projection with the engagement groove when the moving portion is in the first position, and when the lid body is closed, the projection and the engagement groove are disengaged by pushing a second end portion on a side opposite to a first end portion of the seesaw structure with the releasing portion.

* * * * *